United States Patent
Pilchowski et al.

(10) Patent No.: US 7,690,254 B2
(45) Date of Patent: Apr. 6, 2010

(54) SENSOR WITH POSITION-INDEPENDENT DRIVE ELECTRODES IN MULTI-LAYER SILICON ON INSULATOR SUBSTRATE

(75) Inventors: Jorg Pilchowski, Mercer Island, WA (US); Uwe Pilchowski, legal representative, Weyhe (DE); Michael J. Foster, Issaquah, WA (US); Shifang Zhou, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 32 days.

(21) Appl. No.: 11/829,014

(22) Filed: Jul. 26, 2007

(65) Prior Publication Data
US 2009/0025477 A1  Jan. 29, 2009

(51) Int. Cl.
  *G01P 15/125* (2006.01)
  *G01P 9/04* (2006.01)
(52) U.S. Cl. ............................... 73/514.32; 73/504.14
(58) Field of Classification Search ............ 73/514.32, 73/514.36, 514.38, 514.29, 514.16, 504.12, 73/504.14, 504.04
See application file for complete search history.

(56) References Cited

U.S. PATENT DOCUMENTS

| | | | |
|---|---|---|---|
| 5,969,782 A | 10/1999 | Lee et al. | |
| 6,000,280 A | 12/1999 | Miller et al. | |
| 6,277,666 B1 | 8/2001 | Hays et al. | |
| 6,582,985 B2 | 6/2003 | Cabuz et al. | |
| 6,612,029 B2 | 9/2003 | Behin et al. | |
| 6,705,116 B2 | 3/2004 | Matsuo et al. | |
| 6,744,173 B2 | 6/2004 | Behin et al. | |
| 7,270,003 B2 * | 9/2007 | Sassolini et al. | 73/514.32 |
| 7,469,588 B2 * | 12/2008 | LaFond et al. | 73/514.32 |
| 2002/0005976 A1 | 1/2002 | Behin et al. | |

FOREIGN PATENT DOCUMENTS

| | | |
|---|---|---|
| EP | 1624584 A | 2/2006 |
| JP | 8166405 A | 6/1996 |

OTHER PUBLICATIONS

W. Tang, et al.; Electrostatic comb drive levitation and control method; IEEE; vol. 1, No. 4, pp. 170-178, Dec. 1992.

(Continued)

*Primary Examiner*—Helen C. Kwok (57) ABSTRACT

A microelectromechanical system (MEMS) includes a housing defining an enclosed cavity, stator tines extending from the housing into the cavity, a MEMS device located within the cavity, the MEMS device including a proof mass and rotor tines extending from the proof mass, each rotor tine being positioned at a capacitive distance from a corresponding stator tine. The rotor tines include a first section extending a first distance from an insulating layer of the rotor tines and a second section extending a second distance from the insulating layer in an opposite direction from the first section. The stator tines include a first section extending a first distance from an insulating layer of the stator tines and a second section extending a second distance from the insulating layer in an opposite direction from the first section, the stator tine first distance being greater than the rotor tine first distance.

11 Claims, 9 Drawing Sheets

OTHER PUBLICATIONS

E. Carlen, et al.; High-aspect ratio vertical comb-drive actuator with small self-aligned finger gaps; IEEE; vol. 14, No. 5, 5, pp. 1144-1155, Oct. 2005.

Edwin T. Carlen, et al.; High-Aspect Ratio Vertical Comb-Drive Actuator With Small Self-Aligned Finger Gaps; Journal of Microelectromechanical Systems, vol. 14, No. 5, Oct. 2005; IEEE 2005, pp. 1144-1155.

Julius Ming-Lin Tsai, et al.; The BELST II process for a silicon high-aspect-ratio micromaching vertical comb actuator and its applications; Journal of Micromechanics and Microengineering, IOP Publishing Ltd 2004, pp. 235-241.

Q.X. Zhang, et al.; Fabrication technique for microelectromechanical systems vertical comb-drive actuators on a monolithic silicon substrate; American Vacuum Society 2005, pp. 32-41.

Arjun Selvakumar, et al.; Vertical Comb Array Microactuators; Journal of Microelectromechanical Systems, vol. 12, No. 4, Aug. 2003; IEEE 2003, pp. 440-449.

C. Tsou, et al.; Self-Aligned Vertical Electrostatic Combdrives for Scanning Micromirrors; IEEE 2005, pp. 72-75.

Toshiyuki Tsuchiya, et al.; A Z-Axis Differential Capacitive SOI Accelerometer With Vertical Comb Electrodes; IEEE 2004, pp. 524-527.

* cited by examiner

SENSOR WITH POSITION-INDEPENDENT DRIVE ELECTRODES IN MULTI-LAYER SILICON ON INSULATOR SUBSTRATE

BACKGROUND OF THE INVENTION

High performance Micro-Electro-Mechanical Systems (MEMS) inertial instruments (accelerometers and gyros) require closed-loop operation. Good performance under vibration requires that the magnitude of the electrostatic feedback force be highly insensitive to the position of the instrument's inertial mass relative to it's null position. Because of their high force dependency on position, the typical electrostatic vertical comb drive as employed in MEMS actuators cannot be applied to precision MEMS inertial instruments. There have been attempts to provide an electrostatic MEMS drive with very low position sensitivity, but they have been costly due to the numerous manufacturing steps required.

Therefore, there exists a need for an electrostatic MEMS drive, which has very low position sensitivity.

SUMMARY OF THE INVENTION

An example embodiment of the present invention includes a micoroelectromechanical system (MEMS) that includes a housing formed from a double layer silicon on insulator (SOI) material having an insulating layer separating a first section from a second section, the housing defining an enclosed cavity such that the insulating layer from the housing SOI material runs along a length of each stator tine and is disposed between a first section of each stator tine extending a first distance from the insulating layer and a second section of each stator tine extending a second distance from the insulating layer in an opposite direction from the first section, the first section of each stator tine being electrically connected to the first section of the housing and the second section of each stator tine being electrically connected to the second section of the housing; one or more stator tines extending from the housing into the cavity; a MEMS device located within the cavity, the MEMS device including a proof mass formed from a double layer SOI material having an insulating layer separating a first section from a second section, the proof mass coupled to the housing; and one or more rotor tines extending from the proof mass such that the insulating layer from the proof mass SOI material runs along a length of each rotor tine and is disposed between a first section of each rotor tine extending a first distance from the insulating layer and a second section of each rotor tine extending a second distance from the insulating layer in an opposite direction from the first section, each rotor tine being positioned at a capacitive distance from a corresponding stator tine, the first section of each rotor tine being electrically connected to the first section of the proof mass and the second section of each rotor tine being electrically connected to the second section of the proof mass. In an example embodiment, the proof mass is configured to deflect in a direction approximately orthogonal to a vector normal between the corresponding tines and the stator tine first distance is greater than the rotor tine first distance.

In accordance with further aspects of the invention, the stator tine second distance is approximately equal to the rotor tine second distance.

In accordance with other aspects of the invention, the system includes a contact structure that electrically connects the first section of the rotor tines to the second section of the rotor tines through at least one of the insulating layer of the proof mass or the insulating layer of the rotor tines.

In accordance with still further aspects of the invention, the insulating layer of the rotor tines and the insulating layer of the stator tines are oxide layers.

In accordance with yet other aspects of the invention, the system includes a contact structure that electrically connects a first portion of the first section of the housing to a first portion of the second section of the housing through a region of the insulating layer of the housing. The example system also includes an isolation trench that electrically isolates the first portion of the first section of the housing from a second portion of the first section of the housing, the first section of the stator tines remaining electrically connected to the second portion of the first section of the housing and the second section of the stator tines remaining electrically connected to the second portion of the second section of the housing while the second portion of the first section of the housing remains electrically isolated from the second portion of the second section of the housing.

In accordance with still further aspects of the invention, the MEMS device includes a sensor such as an accelerometer or a gyro.

As will be readily appreciated from the foregoing summary, the invention provides a microelectromechanical system including a MEMS device using position-independent drive electrodes in a multi-layer substrate.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
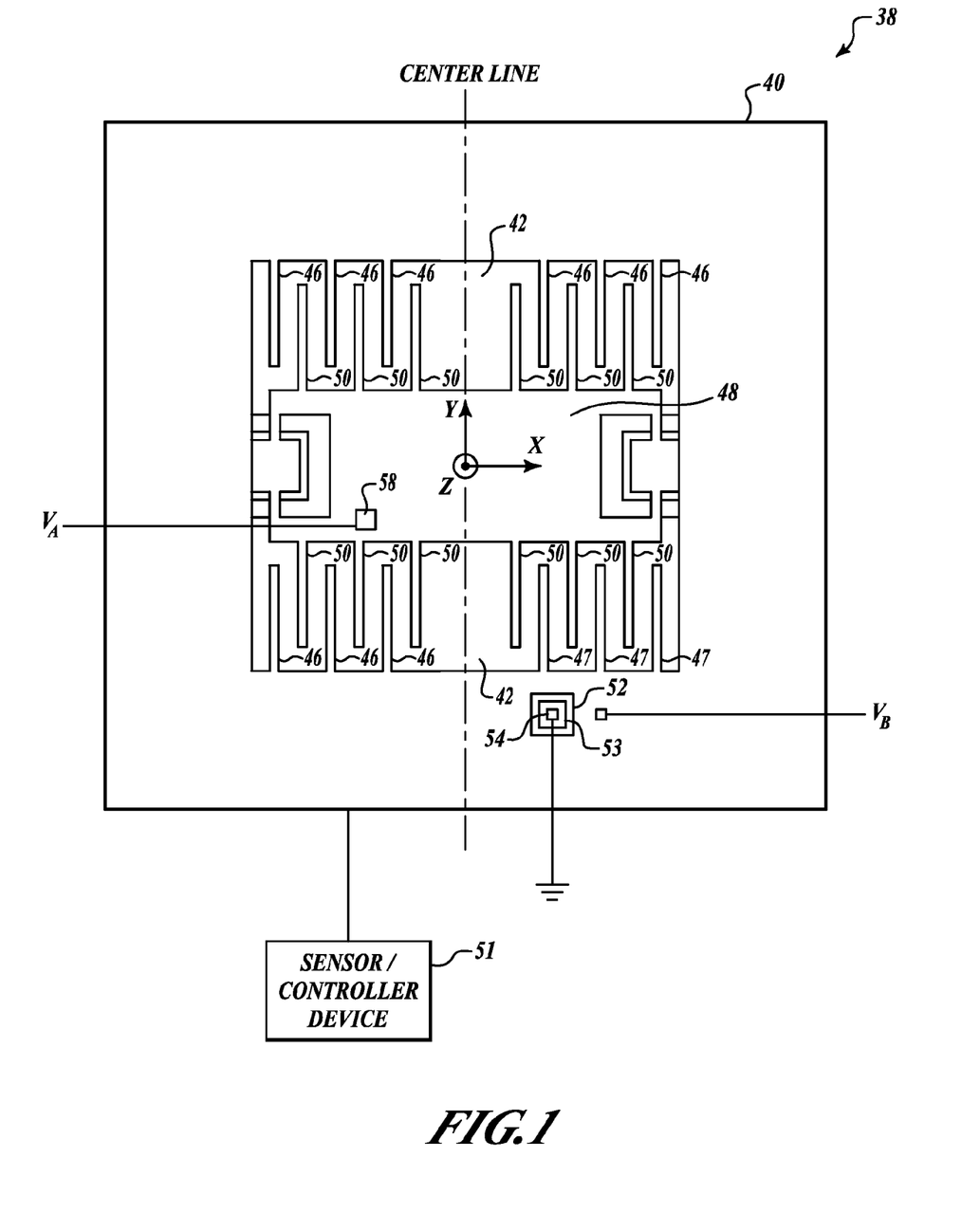
FIG. 1 illustrates a block diagram of a sensor system formed in accordance with an embodiment of the invention.

FIG. 1 illustrates a block diagram of a sensor system 38 formed in accordance with an embodiment of the invention. The system 38 includes a housing 40 defining an enclosed cavity 42. A plurality of stator tines 46 extend from the housing 40 into the enclosed cavity 42. A proof mass 48 is suspended within the enclosed cavity 42 and includes a plurality of rotor tines 50 that are spaced apart at a capacitive distance from the stator tines 46. In an example embodiment, the housing 40, the stator tines 46, the proof mass 48, and the rotor tines 50 are formed of a double layer silicon on insulator (SOI) material having an insulating layer separating a first section from a second section. In an example embodiment, the sensor system 38 includes a microelectromechanical system (MEMS) accelerometer and/or gyro.

The range of the total thickness is 24 to 100 microns. The stator is the full height dimension (24 to 100 microns), and the rotor is roughly ¾ of that height. The stator and rotor tines would be approximately ¾ of the total thickness, with a ¼ offset. For Example, if the total thickness is 24 microns, then the thickness of the rotor and stator combs would be 18 microns, with a 6 micron offset.

A sensor/controller device 51 is in signal communication with the sensor system 38. In an example embodiment, the device 51 senses vertical relative motion between the proof mass 48 and the housing 40. Typically, this sense, or pick-off, would operate capacitively. In closed-loop operation, once the device 51 senses a proof mass movement, the device 51 sends a signal to the stator tines 46 in order to force the rotor tines 50 back to a null position. The signal (e.g., voltage value) that is sent to the stator tines 46 for forcing the rotor tines 50 back to null position is used to calculate the amount of acceleration that the proof mass 48 is experiencing.

The housing 40 is shown with a filled isolation trench 52 enclosing a first volume 53 of the first section of the SOI material of the housing 40 that is separated from the remainder of the first section of the SOI material of the housing 40. A conducting structure 54 is located within the first volume 53 and extends into the housing 40, connecting both sections (layers) of the SOI material of which the housing 40 is formed through the insulating layer of the housing 40. The conducting structure 54 is connected to ground in an example embodiment, but is connected to a voltage source in other embodiments. A contact pad 56 is attached to an area of the first section of the SOI material of the housing 40 that is electrically isolated from the first volume 53 by the isolation trench 52. In an example embodiment, the contact pad 56 does not extend through both layers of SOI material of which the housing 40 is formed. The contact pad 56 is connected to a voltage $V_B$ in an example embodiment. This allows the voltage $V_B$ to be applied to one layer of the SOI material, while ground or the other applied voltage source is applied to the other layer of the SOI material, resulting in differing voltages on each section (layer) of the stator tines 46. Although not shown, additional structures similar to the isolation trench 52, the conducting structure 54, and the contact pad 56 are also present in an embodiment.

A conducting structure 58 is located on part of the proof mass 48 in an example embodiment. The conducting structure 58 extends into the proof mass 48, connecting both layers of the SOI material of which the proof mass 48 and rotor tines 50 are formed. The conducting structure 58 is connected to a voltage $V_A$ in an example embodiment. This allows the voltage $V_A$ to be applied to both layers of the SOI material, so that both layers of the SOI material that form the rotor tines 50 receive the voltage $V_A$. Although the conducting structure 58 is shown located on the proof mass 48 in this example, the conducting structure 58 could be located on other structures made of the same SOI material as the rotor tines 50.

Figure 2:
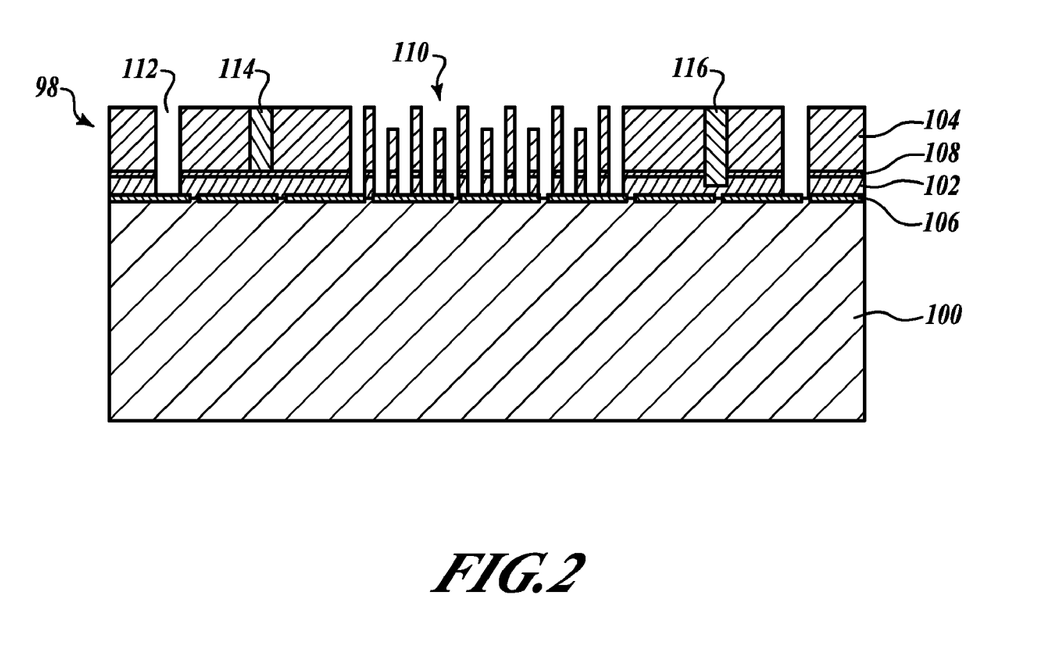
FIG. 2 illustrates a cross-sectional view of components used in an embodiment of the invention.

FIG. 2 illustrates a cross-sectional view of components and structures used in an embodiment of the invention. An example embodiment is formed in a fabrication process from a starting material 98. The starting material 98 includes a silicon handle wafer 100, a first silicon on insulator (SOI) layer 102, and a second SOI layer 104. The first SOI layer 102 is separated from the handle wafer 100 by a first buried silicon oxide (BOX) layer 106 and from the second SOI layer 104 by a second BOX layer 108. In an example embodiment, the SOI layers 102, 104 are silicon on oxide layers.

The fabrication process produces various structures in the two SOI layers 102, 104 including a Vertical Comb actuator (VCA) 110 with offset stationary and movable comb fingers. The process also produces open trenches and/or structures 112 through both SOI layers 102, 104 and the second BOX layer 108; open structures with the second SOI layer 104 being partially or fully removed; trenches and/or structures in the second SOI layer 104 which are filled with an electrically isolating material 114; and structures connecting the first SOI layer 102 and the second SOI layer 104 through the second BOX layer 108 by being filled with an electrically conducting material 116.

In an example embodiment, the forming of structures in the SOI layers 102, 104 of the silicon wafer can be divided into fabrication steps that include trench filling, device mask patterning, and SOI etching, which are described in additional detail below.

FIGS. 3-14 illustrate cross-sectional views of steps in a trench filling process in accordance with an embodiment of the invention. A double SOI wafer 130 is used as starting material. In similar fashion to that described for FIG. 2, the wafer 130 includes a silicon handle wafer 132, a first SOI layer 134, and a second SOI layer 136. The first SOI layer 134 is separated from the handle wafer 132 by a first BOX layer 138 and from the second SOI layer 136 by a second BOX layer 140.

Figure 3:
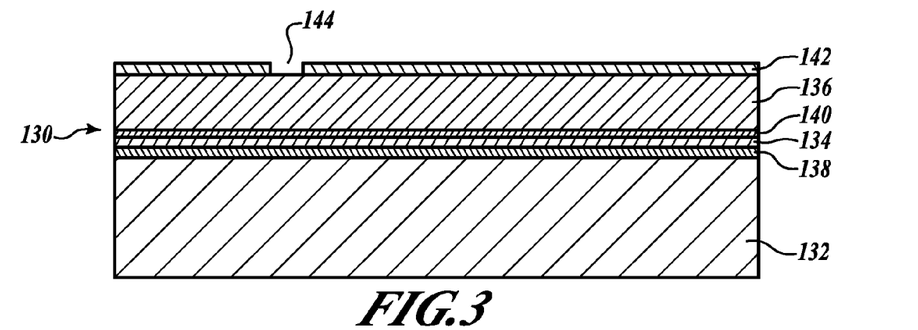
FIGS. 3-14 illustrate cross-sectional views of steps in a trench filling process in accordance with an embodiment of the invention.
Figure 4:
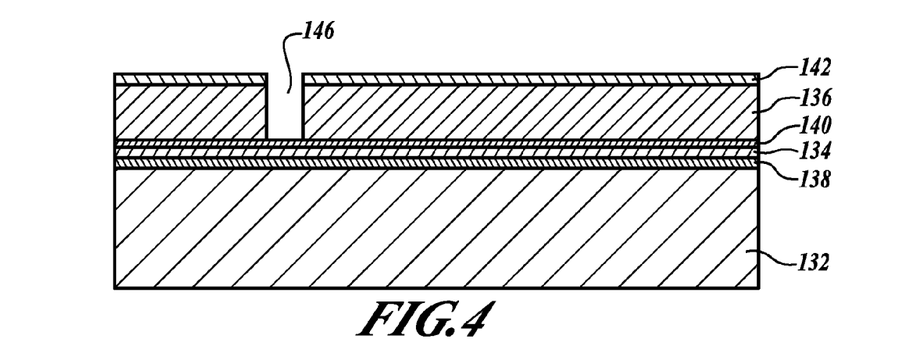
Figure 5:
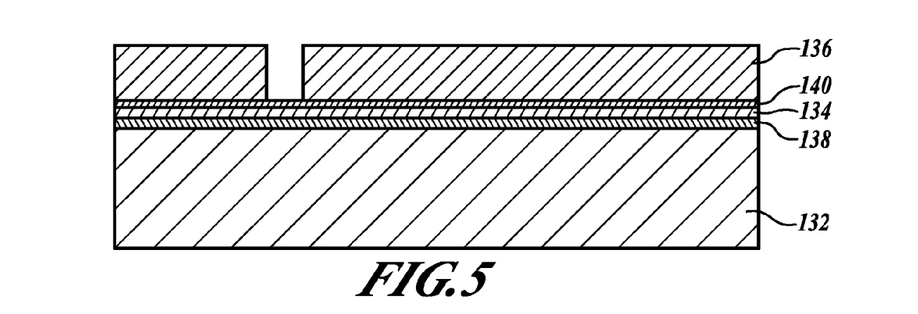

FIG. 3 illustrates a first masking layer 142 being deposited on the wafer 130 surface and patterned with an isolation trench layout 144, such as by being photo-resist patterned using photo-lithography, for example. The patterned first masking layer 142 is then used as a mask for etching the second SOI layer 136 in the exposed areas to form a trench 146, as shown in FIG. 4. In an example embodiment, the etching is anisotropic (into the wafer only), which is commonly accomplished by Deep Reactive Ion etching (DRIE) and stops on the second BOX layer 140. After silicon etching, the remaining masking layer 142 is stripped as shown in FIG. 5, such as by plasma ashing or in a solvent solution, for example.

Figure 6:
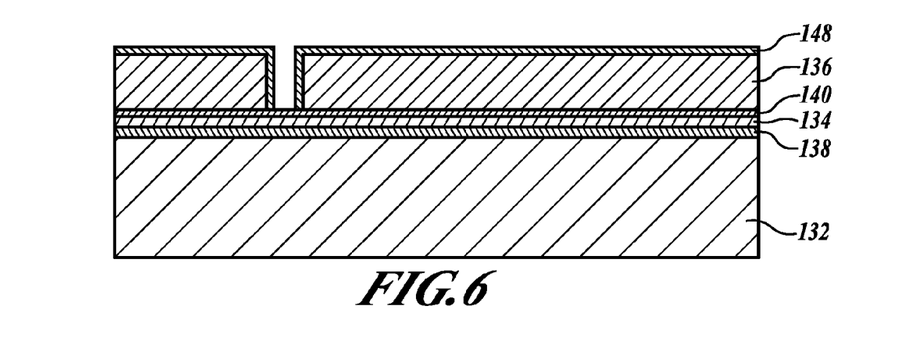
Figure 7:
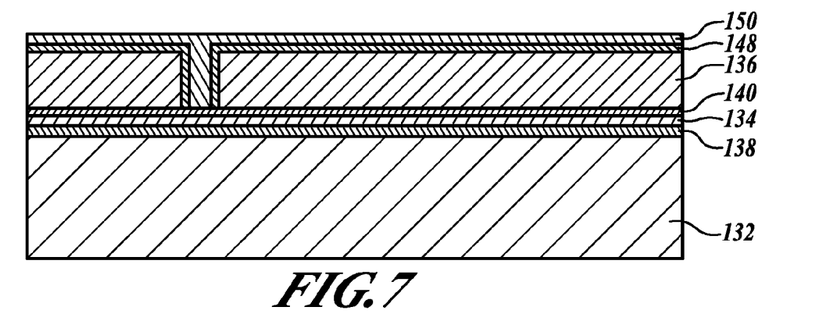
Figure 8:
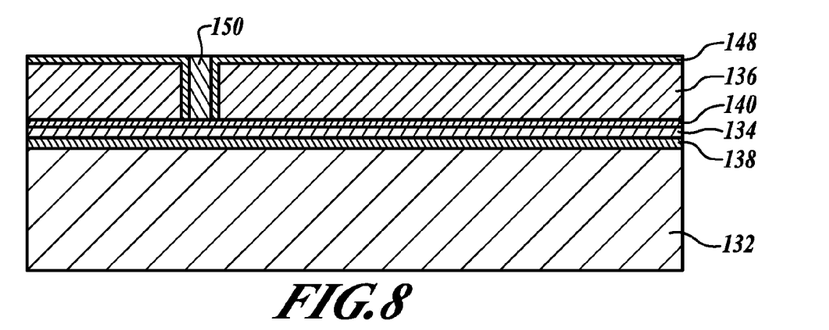

FIGS. 6-8 illustrate that the trench 146 is then filled with an electrically isolating and mechanically connecting material. The material can be a single material or multiple materials, such as silicon dioxide, silicon nitride, poly-silicon, or materials with similar properties. If poly-silicon is used in an example embodiment, sidewalls of the trench 146 are lined with oxide or nitride before the trench center is filled with poly-silicon.

FIG. 6 illustrates one variation, where the trench 146 sidewalls are first lined with an electrically isolating material, shown as a first iso-layer 148 that is formed of thermally grown silicon dioxide in an example embodiment. Then, as shown in FIG. 7, the center of the trench 146 is filled with another electrically isolating material, shown as a second iso-layer 150 such as Low Pressure Chemical Vapor Deposition (LPCVD) silicon nitride. Next, as illustrated in FIG. 8, the second iso-layer 150 material is removed from the wafer 130 surface, stopping on the first iso-layer 148.

Figure 9:
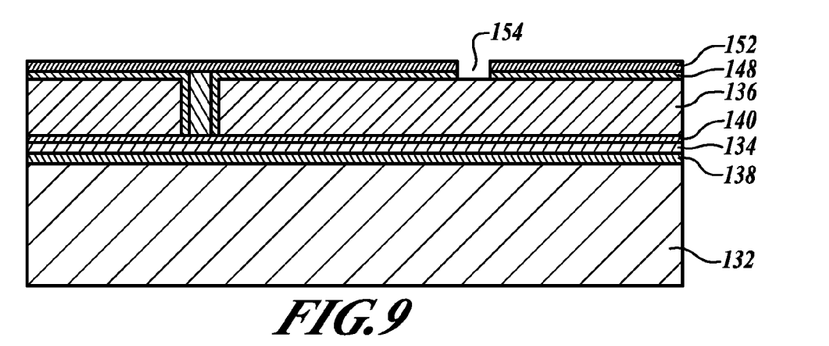
Figure 10:
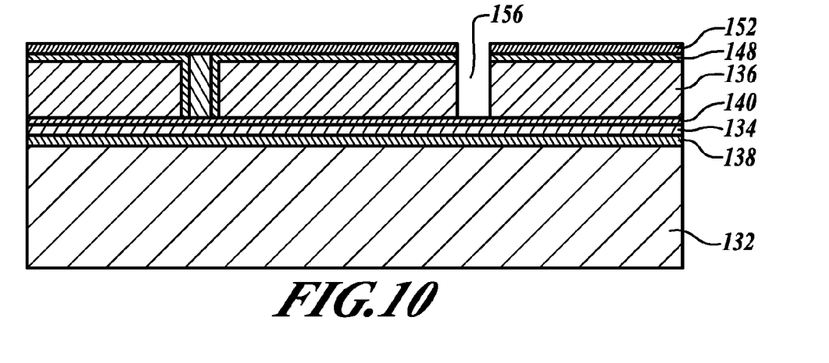
Figure 11:
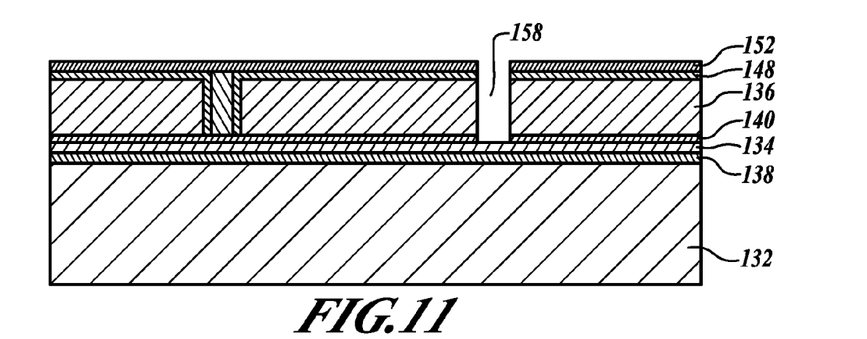
Figure 12:
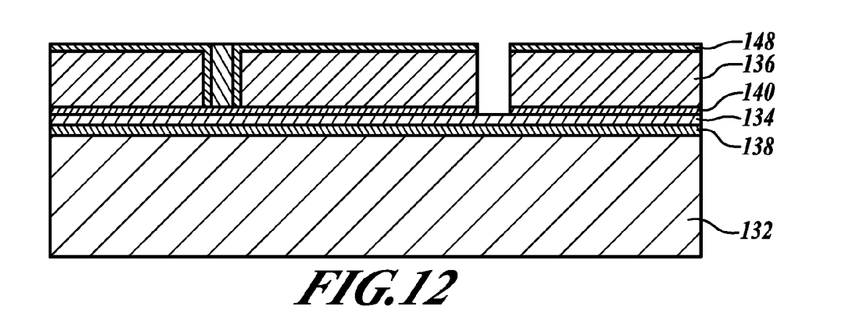
Figure 13:
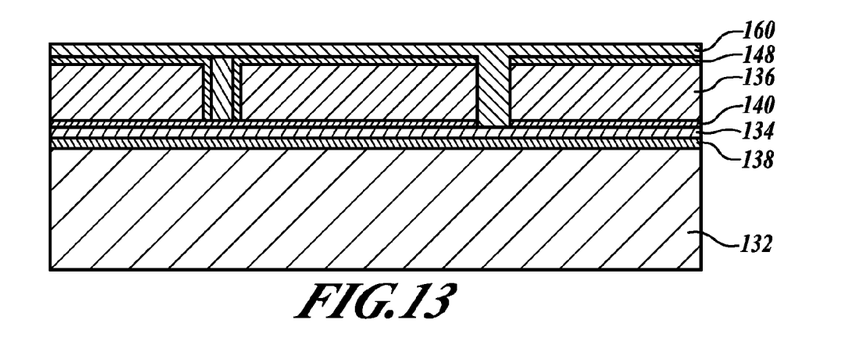
Figure 14:
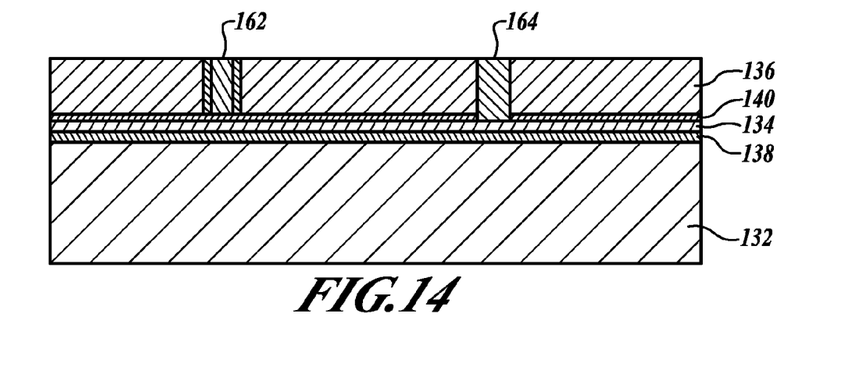

FIGS. 9-14 illustrate additional steps that electrically connect the first and second SOI layers 134, 136 such as may be used in a portion of a moveable comb electrode. FIG. 9 shows that a resist mask 152 is patterned on the wafer surface with a contact trench/hole layout 154. In an example embodiment, this is formed using photolithography with the pattern being transferred into the first iso-layer 148 below, such as by reactive ion etching (RIE), for example. Next, as shown in FIG. 10, a silicon etching step follows where the second SOI layer 136 is etched in an exposed area 156 to the second BOX layer 140. In an example embodiment, etching is anisotropic (into the wafer only), such as by DRIE. Next, as shown in FIG. 11, the second BOX layer 140 is removed in an unmasked area to form an open contact trench 158 such as by RIE or in a diluted hydrogen fluoride (HF) solution. Then, as shown in FIG. 12, the remaining resist mask 152 on the wafer surface is stripped such as by plasma ashing or in a solvent solution, for example. As shown in FIG. 13, the open contact trench 158 is filled with an electrically conductive material 160, such as insitu doped poly-silicon deposited by LPCVD, electrically connecting the second SOI layer 136 and the first SOI layer 134. Next, as shown in FIG. 14, the conductive layer and the first isolayer 148 are removed from the wafer surface. In some embodiments, this is done by silicon RIE and oxide RIE, or by wafer surface grinding and polishing. The resulting wafer is a double SOI material with an embedded isolation trench 162 and a contact trench 164. The wafer may include various numbers and structures of isolation and contact trenches 162, 164.

Figure 15:
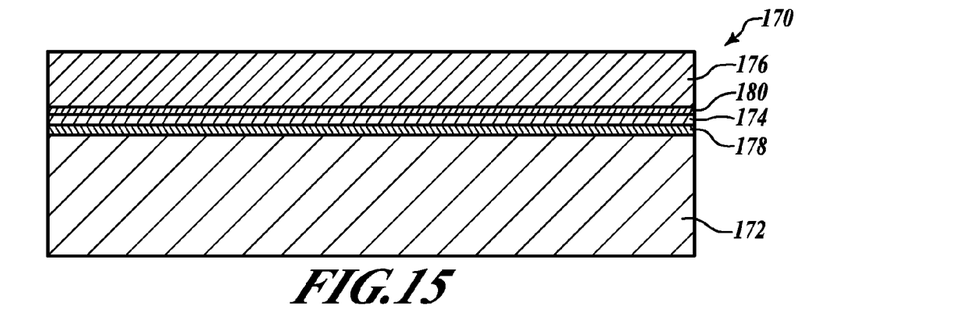
FIGS. 15-18 illustrate cross-sectional views of steps in a device mask patterning process in accordance with an embodiment of the invention.

FIGS. 15-18 illustrate cross-sectional views of steps in a device mask patterning process in accordance with an embodiment of the invention. The starting material shown in FIG. 15 is a double SOI wafer 170. In similar fashion to that described for FIG. 3, the wafer 170 includes a silicon handle wafer 172, a first SOI layer 174, and a second SOI layer 176. The first SOI layer 174 is separated from the handle wafer 172 by a first BOX layer 178 and from the second SOI layer 176 by a second BOX layer 180.

Figure 16:
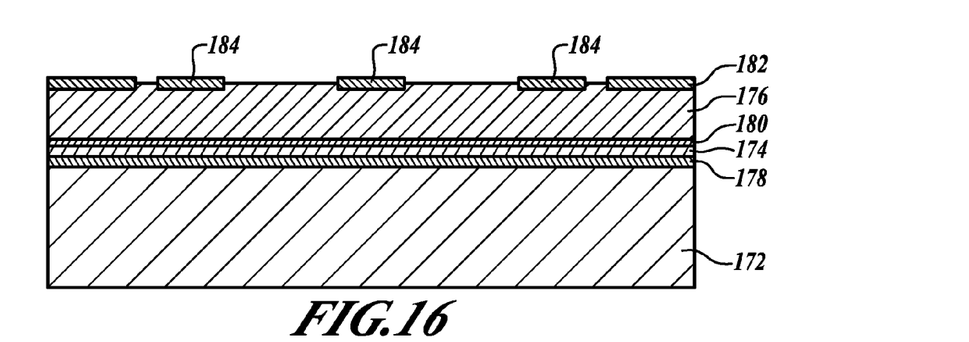
Figure 17:
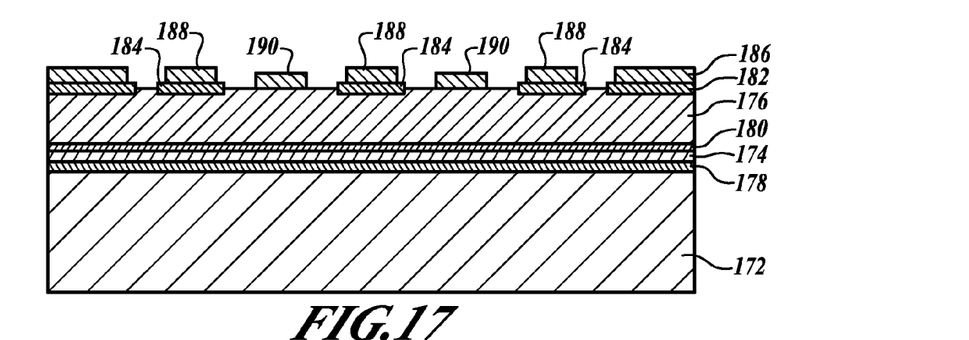

A first mask 182, such as an oxide mask is deposited and patterned with a plurality of stationary elements 184, such as stator components of a VCA, and with patterns defining the mechanical structure of the sensor (not shown). A second mask 186, such as a resist mask, is deposited and patterned with stationary 188 and movable elements 190 of the VCA as well as with sensor patterns requiring etching through both SOI layers 174, 176 and the second BOX layer 180, such as a proof mass, beams, flexures, proof mass anchors, and proof mass perforations (all not shown). The stationary comb elements 188 defined in the second mask 186 are smaller than the stationary comb elements 184 defined in the first mask 182.

Figure 18:
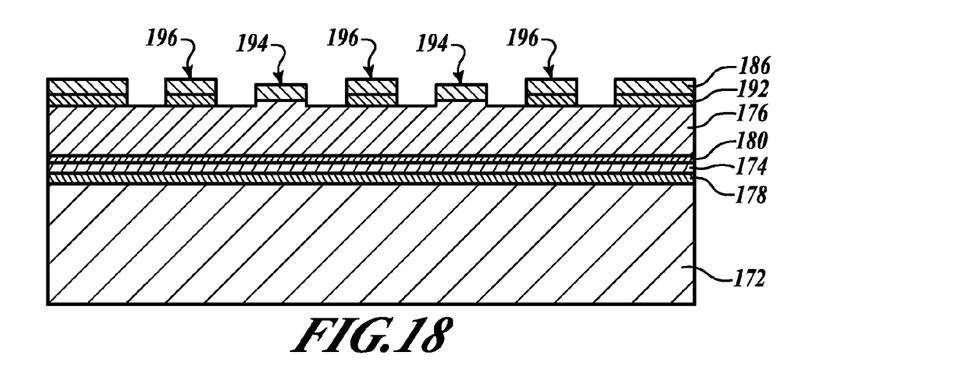
Figure 19:
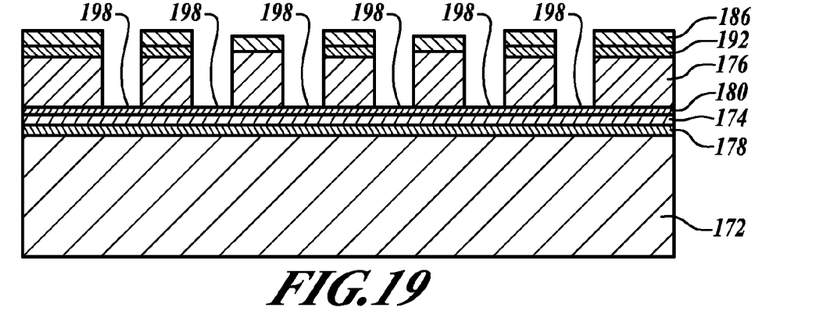
FIGS. 19-24 illustrate cross-sectional views of steps in a Silicon-On-Insulator (SOI) etching process in accordance with an embodiment of the invention.
Figure 20:
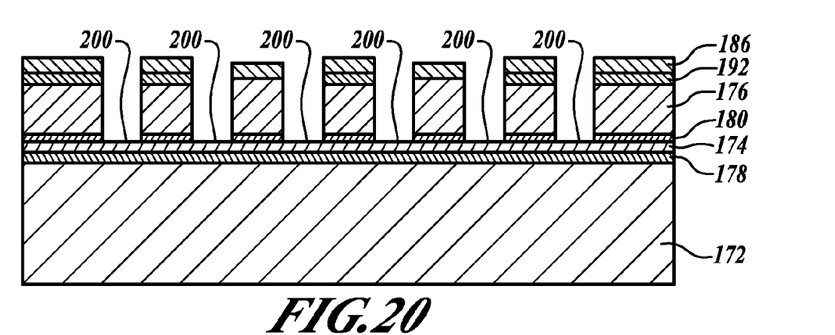

After patterning of the second mask 186, the pattern of the second mask 186 is transferred into the underlying first mask 182 to form a modified first mask 192 as shown in FIG. 18, such as by RIE. The resulting multi-layer mask includes the second mask material (resist) for the movable elements of the VCA, and the modified first mask 192 and second mask 186 material for the stationary elements of the VCA and for the other sensor structure patterns (not shown). The masking method can be repeated to deposit and pattern additional masks, defining multiple etch depths into the second SOI layer 176 or to completely remove the second layer 176 in open areas.

The definition of the stator and rotor elements by the same mask (second mask 186) self-aligns the stator to rotor pattern by centering a rotor element 194 between two stator elements 196.

FIGS. 19-24 illustrate cross-sectional views of steps in a Silicon-On-Insulator (SOI) etching process in accordance with an embodiment of the invention. During a first silicon etching step, the second SOI layer 176 is etched to the second BOX layer 180 using the multi-layer mask including masks 186, 192 as an etch mask to form the structure shown in FIG. 19. Etching is anisotropic, into the wafer only, which is commonly accomplished by DRIE using sulfur hexafluoride ($SF_6$) and octafluorocyclobutane ($C_4F_8$) as precursors. Next, the second BOX layer 180 is removed in exposed areas 198, such as by RIE or in a diluted HF solution to form the structure shown in FIG. 20.

Figure 21:
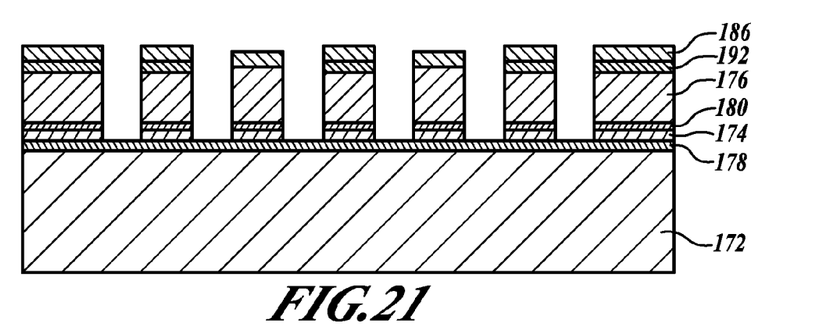
Figure 22:
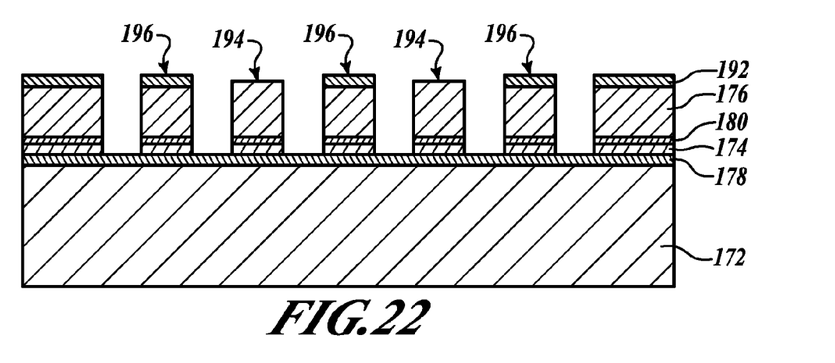
Figure 23:
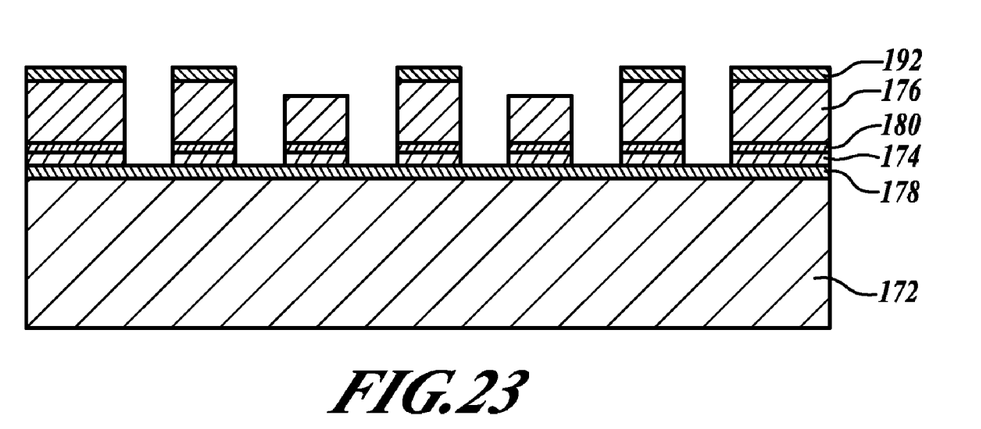

During a second silicon etching step, the first SOI layer 174 is etched to the first BOX layer 178 in exposed areas 200 to form the structure shown in FIG. 21. Etching is anisotropic as during the first silicon etching step. Next, the remaining second mask 186 (resist) of the double-layer surface mask is selectively removed, such as by plasma ashing using an oxygen precursor or in a solvent solution to form the structure shown in FIG. 22. This exposes the movable comb elements 194 of the VCA as well as other device structures requiring a thinned second SOI layer 176, while the stationary comb elements 196 of the VCA are still masked by the modified first mask layer 192 (oxide). During a third silicon etching step, the second SOI layer 176 is etched in the exposed areas of the movable comb elements 194 of the VCA to form the structure shown in FIG. 23. The etching direction is into the wafer again, as during the previous silicon etching steps, preserving the previously etched structures. The etching is timed such that the movable comb elements 194 as well as other device structures (not shown) requiring a thinned second SOI layer 176 are shortened to a pre-defined height.

If additional masking layers (not shown) were deposited and patterned, the method of etching the second SOI layer 176 would be modified such that the deepest structure is opened first (by removing its mask) and then etched to a depth of its final etch depth minus the etch depths of the following second SOI layer 176 etches. The process is repeated for other structures with different etch depths in the second SOI layer 176, with the most shallow etch being executed last.

Figure 24:
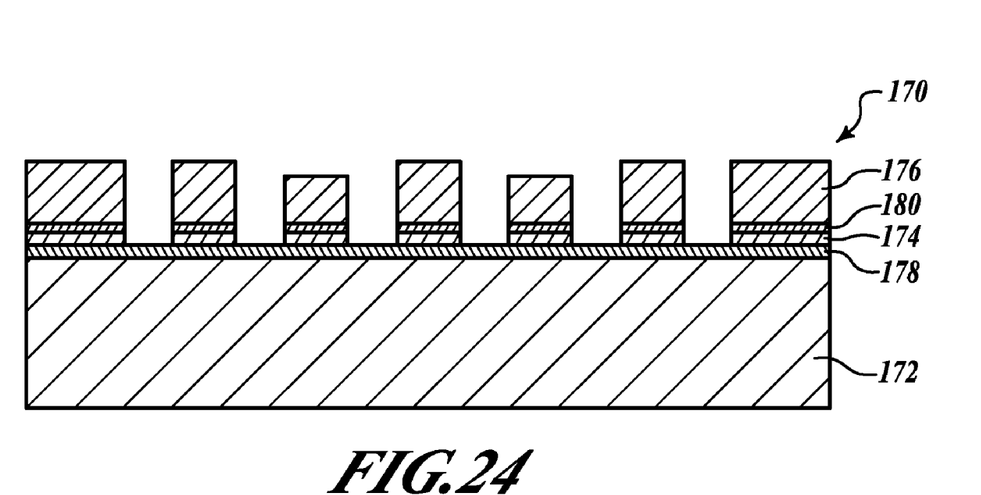
Figure 25:
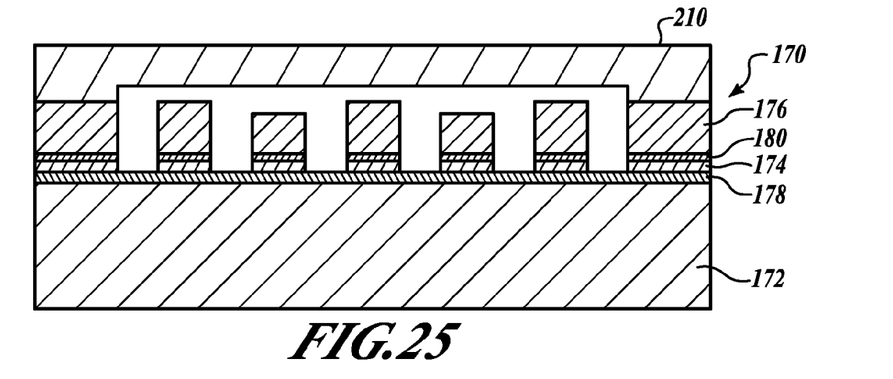
FIGS. 25-28 illustrate cross sectional views of steps performed after SOI etching in accordance with an embodiment of the invention.

Then, the remaining modified first mask layer 192 (oxide) is removed from the surface of the processed wafer 170 to form the structure shown in FIG. 24, such as by RIE or etching in a diluted HF solution. During this mask-stripping step, care must be taken to not completely remove the first BOX layer 178 which would release the SOI structures prematurely. Therefore, anisotropic reactive ion etching is the preferred method, taking advantage of its higher surface etch rate compared to the first BOX layer 178 etch rate, and a nearly zero etch rate of the second BOX layer 180.

FIGS. 25-28 illustrate cross sectional views of steps performed after SOI etching in accordance with an embodiment of the invention. After mechanical structures are fabricated in the SOI layers 174, 176, the processed SOI wafer 170 is bonded to a first cover 210 to form the structure shown in FIG. 25. The cover 210 is formed of a glass substrate, such as pyrex, in which various structures (not shown) have been separately fabricated in an example embodiment of the invention. As examples, anodic bonding or bonding using an interlayer adhesive such as glass-frit, polymer, or metal can be used for attaching the cover 210 to the processed SOI wafer 170. Sets of electrodes of the parallel plate type are formed between the processed SOI wafer 170 and the cover 210 by using silicon structures (not shown) as a movable electrode and metal pads (not shown) on the cover 210 as a stationary electrode. The electrodes are separated by a gap which is formed by etching a recess into the cover 210. In an example embodiment, the cover 210 also provides metallized contact pads (not shown) connected to the second SOI layer 176, metallized contact pads (not shown) in recessed areas for wire-bonding to a sensor package, and metal lines (not shown) between the contact pads.

Figure 26:
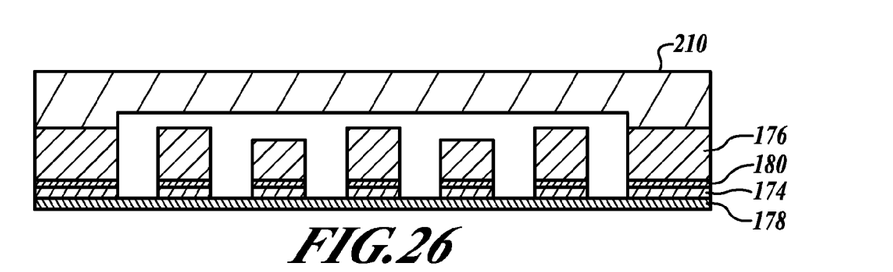

After the processed SOI wafer 170 with the SOI layers 174, 176 has been bonded to the first cover 210, the silicon handle wafer 172 is removed, stopping on the first BOX layer 178 to form the structure shown in FIG. 26. As examples, this can be done by a combination of processes or by a single process that include grinding, polishing, and etching processes selective to oxide, including wet chemical etching in alkaline solutions such as potassium hydroxide (KOH), ethylene diamine-pyrocatechol (EDP), and tetramethyl ammonium hydroxide (TMAH) as well as plasma etching using fluorine radicals.

Figure 27:
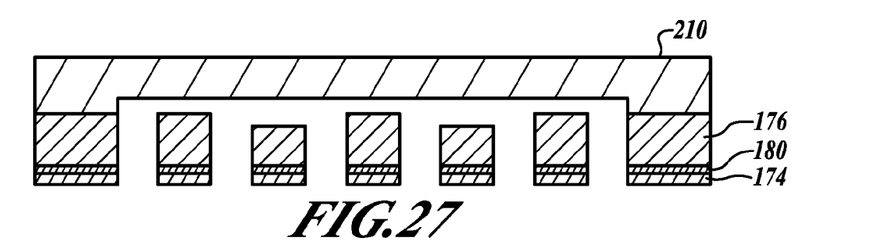

Next, the exposed oxide layer of the first BOX layer 178, is removed stopping on the first SOI layer 174 to form the structure shown in FIG. 27. As examples, this can be done by an etching process selective to silicon, such as by plasma etching using carbon tetrafluoride ($CF_4$)/carbon hydro-trifluoride ($CHF_3$) precursors or by wet chemical etching in a diluted hydrogen fluoride (HF) solution. This process releases movable silicon structures previously formed in the SOI layers.

Figure 28:
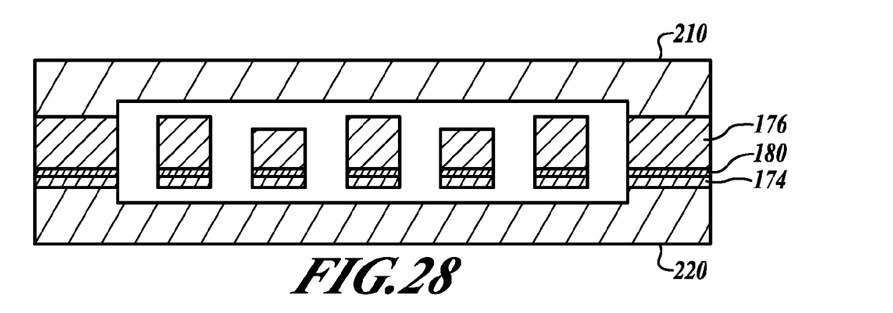

In some embodiments, a second cover 220 is bonded to the first SOI layer 174 to form the structure shown in FIG. 28. The second cover 220 is formed of a glass substrate, such as pyrex, in an example embodiment of the invention. Anodic bonding, or bonding using an interlayer adhesive such as glass frit, polymer, or metal can be used for attaching the second cover 220 to the first SOI layer 174. In some embodiments, the second cover 220 includes structures (not shown) previously formed in it, including recesses, metal electrode pads, metal pads used to connect to the first SOI layer 174, metal lines connecting the pads, and/or open access areas for wire bonding to the second cover 220.

Devices are then singulated from the wafer assembly such as by dicing, for example. This may require protecting the devices from process residues during singulation and/or cleaning of the devices.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A microelectromechanical system (MEMS) comprising:
   a housing formed from a double layer silicon on insulator (SOI) material having an insulating layer separating a first section from a second section, the housing defining an enclosed cavity;
   one or more stator tines extending from the housing into the cavity such that the insulating layer from the housing SOI material runs along a length of each stator tine and is disposed between a first section of each stator tine extending a first distance from the insulating layer and a second section of each stator tine extending a second distance from the insulating layer in an opposite direction from the first section, the first section of each stator tine being electrically connected to the first section of the housing and the second section of each stator tine being electrically connected to the second section of the housing; and
   a MEMS device located within the cavity, the MEMS device comprising:
      a proof mass formed from a double layer SOI material having an insulating layer separating a first section from a second section, the proof mass coupled to the housing;
      one or more rotor tines extending from the proof mass such that the insulating layer from the proof mass SOI material runs along a length of each rotor tine and is disposed between a first section of each rotor tine extending a first distance from the insulating layer and a second section of each rotor tine extending a second distance from the insulating layer in an opposite direction from the first section, each rotor tine being positioned at a capacitive distance from a corresponding stator tine, the first section of each rotor tine being electrically connected to the first section of the proof mass and the second section of each rotor tine being electrically connected to the second section of the proof mass;
      wherein the proof mass is configured to deflect in a direction approximately orthogonal to a vector normal between the corresponding tines;
   wherein the stator tine first distance is greater than the rotor tine first distance; and
   wherein the stator tine second distance is approximately equal to the rotor tine second distance.

2. The system of claim 1, wherein the stator tine first distance is 3 microns greater than the rotor tine first distance.

3. The system of claim 1, further comprising a contact structure that electrically connects the first section of the rotor tines to the second section of the rotor tines through at least one of the insulating layer of the proof mass or the insulating layer of the rotor tines.

4. The system of claim 1, wherein the insulating layer of the rotor tines and the insulating layer of the stator tines are oxide layers.

5. The system of claim 1, further comprising:
   a contact structure that electrically connects a first portion of the first section of the housing to a first portion of the second section of the housing through a region of the insulating layer of the housing; and
   an isolation trench that electrically isolates the first portion of the first section of the housing from a second portion of the first section of the housing, the first section of the stator tines remaining electrically connected to the second portion of the first section of the housing and the second section of the stator tines remaining electrically connected to the second portion of the second section of the housing,
   wherein the second portion of the first section of the housing remains electrically isolated from the second portion of the second section of the housing.

6. The system of claim 1, further comprising a first cover attached to a first side of the housing wherein the cover is structured to cover a first side of the stator tines and the MEMS device.

7. The system of claim 6, further comprising a second cover attached to a second side of the housing wherein the cover is structured to cover a second side of the stator tines and the MEMS device.

8. The system of claim 7, wherein the first and second covers include a glass material.

9. The system of claim 8, wherein the glass material is pyrex.

10. The system of claim 1, wherein the MEMS device includes an accelerometer.

11. The system of claim 1, wherein the MEMS device includes a gyro.

* * * * *